E. B. GEORGIA.
BARRELS.
No. 7,289. Reissued Aug. 29, 1876
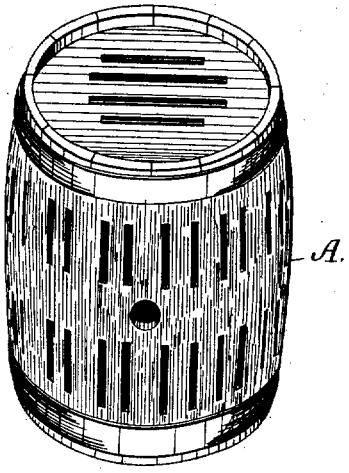
WITNESSES:
W. W. Hollingsworth
Solon C. Kemon
INVENTOR:
E. B. Georgia
BY
Munn & Co
ATTORNEYS.
THE NORRIS PETERS, CO., PHOTO-LITHO., WASHINGTON, D. C.

UNITED STATES PATENT OFFICE.

LIJAH B. GEORGIA, OF CLIFTON, VIRGINIA, ASSIGNOR TO HIMSELF AND MARGARET HETZEL.

IMPROVEMENT IN BARRELS.

Specification forming part of Letters Patent No. 164,542, dated June 15, 1875; reissue No. 7,289, dated August 29, 1876; application filed August 3, 1876.

*To all whom it may concern:*

Be it known that I, ELIJAH B. GEORGIA, of Clifton, in the county of Fairfax and State of Virginia, have invented an Improvement in Barrels; and I do hereby declare that the following is a full, clear, and exact description of the same, reference being had to the accompanying drawing, forming part of this specification, in which my invention is represented by a view in perspective.

The invention relates to means whereby fruits may be packed, transported, and kept without deterioration for a considerable period.

The invention will first be fully described in connection with all that is necessary to a full understanding thereof, and then pointed out in the claim.

A represents a fruit keg or barrel.

In fruit-holders it is a great object to allow the gases of putrefaction, which will always, to some extent, be generated, to readily escape or be taken up by an absorbent, so that the same may not be imbibed through the pores of the fruit, and cause a more or less rapid decomposition. For this purpose I employ a keg or barrel, A, having the staves or heads, or both, sawed or incised longitudinally, or in the direction of the grain, so as to give the necessary aeration without weakening materially the stave, and so as to avoid breaking the continuity of the joint between the contiguous staves.

Having thus described my invention, what I claim is—

A fruit keg or barrel having longitudinal apertures in the staves or heads, or both, as and for the purpose described.

ELIJAH B. GEORGIA.

Witnesses:

SUSAN HETZEL,
ALICE GEORGIA